United States Patent [19]
Leslie et al.

[11] Patent Number: 5,974,875
[45] Date of Patent: *Nov. 2, 1999

[54] APPARATUS AND METHOD FOR PREDICTING CLEAR AIR TURBULENCE

[75] Inventors: Kenrick R. Leslie, Inglewood, Calif.;
Michael L. Shand, Morristown, N.J.;
Martin C. Baker, Budd Lake, N.J.;
Joseph J. Barrett, Morris Plains, N.J.;
Clint P. Kilroy, Neptune, N.J.

[73] Assignee: AlliedSignal Inc., Morristown, N.J.

[*] Notice: This patent issued on a continued prosecution application filed under 37 CFR 1.53(d), and is subject to the twenty year patent term provisions of 35 U.S.C. 154(a)(2).

[21] Appl. No.: 09/129,805

[22] Filed: Aug. 6, 1998

Related U.S. Application Data

[60] Continuation-in-part of application No. 09/083,484, May 22, 1998, which is a division of application No. 08/808,589, Feb. 28, 1997

[60] Provisional application No. 60/013,312, Mar. 8, 1996.

[51] Int. Cl.⁶ .............................. G01F 1/00; G01C 21/00
[52] U.S. Cl. ............................. 73/170.07; 73/170.11; 73/178 R
[58] Field of Search .................... 73/170.02, 170.07, 73/170.08, 170.11, 170.12, 178 R

[56] References Cited

U.S. PATENT DOCUMENTS

| | | | |
|---|---|---|---|
| 3,359,557 | 12/1967 | Fow et al. | 343/100 |
| 3,404,396 | 10/1968 | Buehler et al. | 343/5 |
| 3,427,581 | 2/1969 | Hartman et al. | 340/25 |
| 3,448,613 | 6/1969 | Stanton et al. | 73/170 |
| 3,465,339 | 9/1969 | Marner | 343/100 |
| 3,491,358 | 1/1970 | Hicks | 343/5 |
| 3,540,829 | 11/1970 | Collinson et al. | 356/129 |
| 3,567,915 | 3/1971 | Altshuler et al. | 235/151.3 |
| 3,599,488 | 8/1971 | Mather et al. | 73/178 |
| 3,641,345 | 2/1972 | Coackley et al. | 250/83.3 H |
| 3,646,555 | 2/1972 | Atlas | 343/5 W |
| 3,665,467 | 5/1972 | Haroules et al. | 343/100 ME |
| 3,696,670 | 10/1972 | Collis | 73/170 R |
| 3,715,748 | 2/1973 | Hicks | 343/5 W |
| 3,722,272 | 3/1973 | McPherson | 73/178 R |
| 3,780,293 | 12/1973 | Flint | 250/339 |
| 3,803,601 | 4/1974 | Serafin | 343/5 W |
| 3,856,402 | 12/1974 | Low et al. | 356/5 |
| 3,935,460 | 1/1976 | Flint | 250/349 |
| 4,031,756 | 6/1977 | Rotier et al. | 73/170.02 |

(List continued on next page.)

FOREIGN PATENT DOCUMENTS

| 0 488 004 | 6/1992 | European Pat. Off. . |
| 1288104 | 9/1972 | United Kingdom . |

OTHER PUBLICATIONS

Bender et al, Journal of Applied Meterology, vol. 15, Nov. 1996.

Temperature Gradients and Clear–Air Turbulence Probabilities—pp. 1193–1199.

Tandon et al.; Journal of Materials Science Letters 12; 1993; pp. 1182–1184.

*Primary Examiner*—Max Noori
*Attorney, Agent, or Firm*—Loria B. Yeadon

[57] ABSTRACT

The invention provides a system for passive measurement of atmospheric temperature using a passive direction detector for detecting the energy of a narrow wavelength band emanating from a volume of atmospheric gas. The resulting signal can be associated with an effective temperature. The effective temperature can be associated with an effective range. The system generates a temperature map which can determine, at predetermined time intervals, atmospheric temperatures in an azimuth plane associated with a predefined range from the detector. The temperature map can then be used to calculate temperature gradients that in turn can be used to compute the average Richardson number over an atmospheric layer and other atmospheric conditions to predict the presence of clear air turbulence.

9 Claims, 10 Drawing Sheets

U.S. PATENT DOCUMENTS

| | | | |
|---|---|---|---|
| 4,195,931 | 4/1980 | Hara | 356/346 |
| 4,266,130 | 5/1981 | Kuhn . | |
| 4,303,862 | 12/1981 | Geiger | 250/372 |
| 4,342,912 | 8/1982 | Adamson | 250/339 |
| 4,346,595 | 8/1982 | Frosch . | |
| 4,359,640 | 11/1982 | Geiger | 250/372 |
| 4,427,306 | 1/1984 | Adamson . | |
| 4,474,062 | 10/1984 | Gary . | |
| 4,624,796 | 11/1986 | Giniewicz | 252/62.9 |
| 4,937,447 | 6/1990 | Barrett . | |
| 4,944,891 | 7/1990 | Sagong | 252/62.9 |
| 4,947,165 | 8/1990 | Zweifel . | |
| 4,965,572 | 10/1990 | Adamson . | |
| 4,965,573 | 10/1990 | Gallagher et al. . | |
| 5,105,191 | 4/1992 | Keedy . | |
| 5,117,689 | 6/1992 | Gary | 73/178 R |
| 5,173,704 | 12/1992 | Buehler et al. | 342/26 |
| 5,218,866 | 6/1993 | Phillips et al. | 73/170.12 |
| 5,276,326 | 1/1994 | Philpott . | |
| 5,285,070 | 2/1994 | Barrett . | |
| 5,534,868 | 7/1996 | Gjessing et al. | 342/26 |
| 5,568,151 | 10/1996 | Merritt | 342/192 |
| 5,592,171 | 1/1997 | Jordon | 342/26 |
| 5,602,543 | 2/1997 | Prata et al. | 340/968 |
| 5,615,118 | 3/1997 | Frank | 364/424.013 |
| 5,639,964 | 6/1997 | Djorup | 73/170.12 |
| 5,654,700 | 8/1997 | Prata et al. | 340/963 |

APPARATUS AND METHOD FOR PREDICTING CLEAR AIR TURBULENCE

CROSS REFERENCE TO RELATED APPLICATION

This application is a continuation-in-part of U.S. patent application, Ser. No. 09/083,484 filed on May 22, 1998 which is a divisional of pending U.S. application, Ser. No. 08/808,589, filed on Feb. 28, 1997 which claims the benefit of U.S. Provisional Application No. 60/013,312 filed on Mar. 8, 1996, all of which are incorporated by reference herein.

FIELD OF THE INVENTION

The present invention relates generally to an aircraft flight management system, and an aircraft flight safety system. An apparatus incorporating a passive detector is used for mapping temperature, and for predicting clear air turbulence conditions ahead of the aircraft.

BACKGROUND OF THE INVENTION

Clear air turbulence (CAT) is a major safety concern for large commercial aircraft. CAT is a weather phenomenon that is associated with vertical wind shear and stable layers in the atmosphere. CAT results in a rapidly changing airflow over the lift surfaces of the aircraft. Should the forward velocity of the air over the lift surfaces suddenly decrease, the lift will decrease. In this situation, the aircraft may experience a forced descent due to the down flowing air mass and also by an apparent loss in forward air speed. It is thus desirable that an onboard weather system be capable of providing an advanced warning of such wind conditions.

Since the conditions that result in clear air turbulence are not visually apparent nor are they generally detectable by active sensors such as radar, there have been a number of attempts to detect wind shear and clear air turbulence conditions by passive detectors. In particular, attempts have been made to sense air temperature gradients, which are associated with air turbulence, by detecting the radiation emanating from the atmosphere ahead of the aircraft in the infrared and microwave spectral regions. The intensity of the detected radiation varies with the atmospheric temperatures along the line of sight of the detector. Typically these passive systems use a radiometer to measure the thermal radiation from one of the atmospheric gases such as carbon dioxide ($CO_2$), oxygen ($O_2$) or water vapor ($H_2O$) to determine changes in the spatial temperature profile in front of the aircraft. Examples of such approaches based on the infrared emission of $CO_2$ are provided in U.S. Pat. Nos. 3,475,963, 3,735,136, 3,780,293, 3,935,460, 4,266,130, 4,427,306, 4,937,447, 4,965,572, 4,965,573, 5,105,191, 5,276,326 and 5,285,070. Other approaches determine atmospheric temperature by measuring the microwave emission from $O_2$ as described in U.S. Pat. Nos. 3,359,557, 3,380,055, 4,346,595, and 5,117,689. Systems for measuring atmospheric temperature based on infrared emission from $H_2O$ are described in U.S. Pat. No. 4,266,130 and in the paper by Kuhn et al, "Clear Air Turbulence: Detection by Infrared Observations of Water Vapor" in *Science*, Vol. 196, p. 1099, (1977). In addition, there have been several papers written describing these types of passive infrared systems including: S. M. Norman and N. H. Macoy, "Remote Detection of Clear Air Turbulence by Means of an Airborne Infrared System" AJAA Paper No. 65–459 presented at the AIAA Second Annual Meeting, San Francisco, Calif., Jul. 26–29, 1965; and R. W. Astheimer, "The Remote Detection of Clear Air Turbulence by Infrared Radiation" in *Applied Optics* Vol. 9, No. 8, p. 1789 (1970). In U.S. Pat. No. 4,346,595, Gary describes a microwave radiometer for determining air temperatures in the atmosphere at ranges of about 3 km from the aircraft for the purpose of detecting the height of the tropopause and the presence of temperature inversions. He teaches that by flying the aircraft above or below the tropopause or temperature inversion layer, it is possible to avoid CAT. Since the effective range of the microwave radiometer is relatively short, the system doesn't provide sufficient warning time for the aircraft to avoid the CAT condition. The present invention has detection ranges on the order of 100 km which will allow time for the aircraft to change altitude to avoid CAT.

A number of the above systems were not successful or were only partially successful because they were based solely on the measurement of atmospheric temperature in order to predict the presence of turbulence. A more reliable indication of atmospheric turbulence can be realized by determining the Richardson number, Ri. The use of the Richardson number to determine the stability of the atmosphere is well known in meteorology (see, for example, D. Djuric, *Weather Analysis*, Prentice Hall, Englewood Cliffs, N.J., 1994, p. 64). In the present invention, the Richardson number is used to indicate the probability of CAT. In U.S. Pat. No. 5,117,689, Gary discussed the correlation of the reciprocal of the Richardson number with the occurrence of CAT conditions.

The Richardson number contains two components: (1) the vertical lapse rate of potential temperature and (2) the wind shear which is related to the horizontal temperature gradient. A number of the prior art discussions measure the vertical temperature lapse rate. Gary used the inertial navigation system (INS) to measure the East-West and North-South components of the wind to calculate the wind shear along with a microwave radiometer to measure the air temperature vertical lapse rate. This information is then used to calculate the Richardson number or its reciprocal. The deficiency of the system described in this patent (U.S. Pat. No. 5,117,689) is that it determines the Richardson number at relatively close ranges (less than 3 km) and therefore does not provide advance warning of the CAT condition and that it measures the wind shear only at the aircraft.

Previous approaches for the determination of the range and probability of CAT can be summarized as follows:

U.S. Pat. No. 5,276,326 to Philpott determines turbulence as a function of temperature vs. range through the analysis of infrared radiometer signals at two or more discrete wavelengths. The temperature associated with a given range as a function of wavelength is then derived through a matrix inversion process. This transition is difficult and requires noise and error free input data to yield valid results. The present invention overcomes this difficulty by using only one wavelength. Gary overcomes the multiple wavelength difficulty in U.S. Pat. No. 4,346,595 by measuring effective temperature and range at a single wavelength, however no attempt is made to determine the probability of clear air turbulence using the Richardson number. In U.S. Pat. No. 5,117,689, Gary teaches the significance of the Richardson number in CAT prediction but does not suggest a method to derive Ri directly from radiometric measurements of horizontal and vertical temperature lapse rates obtained by combining azimuth and elevation scanning with the aircraft motion to produce a temperature map.

Since the early 60's several theoretical studies and field experiments have established a link between CAT and mesoand synoptic-scale dynamics. These scales range from 10's of km to 1000 km. The systems include jet streams in association with upper level frontogenesis, gravity waves, mountain waves and Kelvin-Helmholtz Instability (KHI).

Both theoretical studies and laboratory experiments have established the fundamental importance of the Richardson number to the onset of atmospheric turbulence. The Richardson number is defined as $$Ri = \left(\frac{g}{\theta}\right)\frac{\left(\frac{\partial \theta}{\partial z}\right)}{\left|\frac{\partial V}{\partial z}\right|^2} \quad (1)$$

where $$\theta = T\left\{\frac{1000}{p}\right\}^{\frac{R}{C_p}} \quad (2)$$

and where $\theta$ is the potential temperature, $\partial\theta/\partial z$ is the vertical gradient of the potential temperature (defined as the lapse rate), $\partial V/\partial z$ is the vertical wind shear, g is acceleration due to gravity, T is temperature in Kelvin, p is atmospheric pressure in millibars, R is the universal gas constant and $C_p$ is the specific heat of air at constant pressure. The studies by W. T. Roach ("On the influence of synoptic development on the production of high level turbulence," *Quart. J. R. Met. Soc.*, (1970) 96, 413), J. L. Keller ("Clear Air Turbulence as a Response to Meso- and Synoptic-Scale Dynamic Processes," *Monthly Weather Review*, (1990) 118, 2228), both incorporated by reference herein, and others have concluded that although CAT occurs at unresolvable subgrid scales, the energy dissipation rate due to CAT may be determined by resolvable, gridscale dynamical processes. Roach and Keller, in particular, showed that the total Ri tendency, Γ, which is defined as the time rate of change of ln(Ri) following the motion, may be divided into nonturbulent and turbulent components, such that $$\Gamma = \frac{D}{Dt}\ln(Ri) = -\Phi - \xi \quad (3)$$

The nonturbulent component, $\Phi$, is a result of shearing and stretching deformations associated with meso-alpha and synoptic scale disturbances in the upper troposphere. The processes acting to modify ln(Ri) and attributed to ξ are due to the unresolvable subgrid phenomena associated with CAT; these include Kelvin-Helmholtz instabilities with horizontal scales of a few km and random turbulent eddies of a few tens or hundreds of meters. With existing monitoring equipment, measurement of Ri with an appropriate resolution is difficult. Instead, measurement techniques are more likely acquiring a spatial average of Ri. The layered Richardson number, $Ri_L$, is the average of Ri over an atmospheric layer. It is defined as $$Ri_L = \left(\frac{g}{\theta}\right)\frac{\left(\frac{\partial \theta}{\partial z}\right)}{\left|\frac{\partial V}{\partial z}\right|^2} \quad (4)$$

where $\Delta V/\Delta z$ and $\Delta\theta/\Delta z$ are the values of the vertical wind shear and potential temperature lapse rate, respectively, averaged over the atmospheric layer. Currently, $Ri_L$ is calculated from wind and temperature fields obtained from numerical forecast models. Input data for the models are from radiosonde, satellite and pilot reports. The key input data, from the radiosonde, have spatial resolution of approximately 300 km and temporal resolution of 12 hours. Over oceanic areas the spatial resolution is much worse.

An important outcome of the Roach and Keller studies is that the value of $Ri_L=\frac{1}{2}$ appears to be the layered-averaged analog to the Miles-Howard critical value of $Ri=\frac{1}{4}$ which relates to the necessary condition for individual turbulent events. Another important outcome is a means to determine the rate at which energy is transformed from the nonturbulent meso scale to the turbulent scale. The rate, $\epsilon$, at which energy is transformed from the nonturbulent to the turbulent scale is given by $$\varepsilon = (\Delta v)^2 \frac{\Phi}{24} \quad (5)$$

where $\Delta v$ is the change in the horizontal wind speed between the bottom and top of the layer. Keller discloses the critical link between $Ri_L$ and Ri and how sustained turbulent layers may develop in the free atmosphere. As a parcel of atmosphere with an arbitrarily large Ri enters a region where $\Phi>0$, its Ri begins to decrease. If the parcel remains in this environment long enough, Ri will continue to decrease to the Miles-Howard critical value ($Ri=\frac{1}{4}$) necessary for Kelvin-Helmholtz instabilities and turbulence. Once turbulence occurs, vertical mixing would, after several minutes, increase Ri above ¼. If the parcel remains in the same environment, its Ri once again decreases beginning the cycle anew. The process is repeated until the parcel enters a region where $\Phi<0$. While Ri would be varying dramatically over a short distance (on the order of 20 m), its variation averaged over a longer distance (100 m and up), $Ri_L$, would be small. In addition, for the kinetic energy of the vertical shear to be available for transformation to the turbulent scale, the average $Ri_L=\frac{1}{2}$ is necessary.

Other researchers have shown that it is possible to delineate quantitatively the components of turbulence energy. For example, Kennedy and Shapiro (P. J. Kennedy and M. A. Shapiro, "Further Encounters with Clear Air Turbulence in Research Aircraft," *Journal of Atmospheric Sciences*, (1980), 37, 986), incorporated by referenced herein, computed and accounted for the various terms in the turbulence energy budget.

An approximation of the turbulent kinetic energy is given by $$\frac{\partial E}{\partial t} \cong -\langle vw\rangle\frac{\partial V}{\partial z} + \frac{g}{\Theta_o}\langle w\theta\rangle - \varepsilon \quad (6)$$

where E is the turbulent kinetic energy (TKE), V is the wind vector, g is the gravitational acceleration, and $\Theta_o$ is the potential temperature. The angle braces indicate average over space of v, the horizontal velocity perturbation, w the vertical velocity perturbation, and $\theta$ the potential temperature perturbation. $\epsilon$ is the TKE dissipation, and the first two terms are the TKE production due to wind shear and stability respectively.

A simple approach of closing the TKE equation is by using the relation between the covariance of the perturbation quantities and the eddy diffusivities of momentum and heat, so that $$-\langle vw \rangle = K_M \frac{\partial V}{\partial z} \quad (7)$$

$$-\langle w\theta \rangle = K_H \frac{\partial \Theta}{\partial z}$$

where $K_M$ and $K_H$ are the eddy diffusivities for momentum and heat respectively.

An estimate of the dissipation, $\epsilon$, can be obtained from Eq. (6) by assuming a steady-state condition. For this case, the dissipation, $\epsilon$, equals the production. Solving Eq. (6) for $\epsilon$ yields $$\varepsilon = K_H \left(\frac{\partial V}{\partial z}\right)^2 \left(\frac{K_M}{K_H} - Ri\right) \quad (8)$$

and the ratio of the eddy viscosity ($K_M$) to the eddy thermal diffusivity ($K_H$) is the turbulent Prandtl number (Pr).

Studies such as those outlined above have led to the development of a number of algorithms for predicting the probability of detection (POD) of CAT and the false alarm ratio (FAR). The results from using these algorithms, as indicated below, supports the idea that i) mesoscale parameters could be used to infer CAT activity; and ii) the POD and FAR are limited by the spatial, and in particular, the temporal resolutions currently available from radiosonde and numerical model forecasts.

The inputs to the algorithms are derived from various numerical forecast models, such as the nested grid model (NGM) or the global aviation model (AVN), which are produced twice daily (0000 and 1200 UTC) at the National Meteorological Center in Washington, DC. The horizontal resolution of the NGM, for example, is 85 to 90 km over North America, with vertical resolution of 16 layers. The thickness of each NGM layer varies from about 35 mb near the surface to a maximum of 75 mb in the midtroposphere (near 450 mb).

Verification statistics correlated with the algorithms show excellent objective ability to detect or forecast areas of turbulence. Probability of detection statistics indicates that about 75% of CAT events can be predicted. The false alarm ratios suggest a 1 in every 4 or 5 events will be incorrect, based on pilot reports (PIREPS) over the United States. These statistics are not unexpected, however, since the input data are based on 6 and 12 hour forecasts from the numerical models.

Whereas the above mentioned algorithms use the wind field to derive some of the key input parameters, the present invention uses the temperature field. The invention will allow the use of real time measurement of temperature as compared with the 6 hr to 12 hr forecast currently being used. In addition, the invention allows an aircraft (or arbitrary platform) to have the measurements centered at the aircraft. Finally, the invention permits horizontal scale measurements in the order of 10 km to 200 km, vertical scale measurement of between 100 and 500 meters, and temporal resolution on the order of minutes or less, a significant improvement over the current spatial and temporal resolutions.

SUMMARY OF THE INVENTION

It is therefore an object of the invention to provide a method and apparatus for predicting clear air turbulence. The invention provides a system for passive measurement of atmospheric temperature using a detector for detecting the energy of a narrow wavelength band emanating from a volume of atmospheric gas. The resulting signal can be associated with an effective temperature. The effective temperature can be associated with an effective range. A variety of atmospheric gases emitting radiation in a variety of wavelength regions can be used to determine the effective temperature.

It is an additional object of the invention to provide a system utilizing a radiometer to detect the infrared radiation of a predetermined wavelength band of $CO_2$ associated with an effective range that corresponds to the wavelength band in order to measure the temperature of the atmosphere in a predetermined direction and associated with the effective range from the radiometer. A range of suitable wavelengths is 12.2 to 13 $\mu$m where the effective range is 90 to 120 km at an altitude of 35,000 ft.

Radiometers operating in other spectral regions may be used to measure atmospheric temperatures and temperature gradients. Therefore, another object of the invention is to provide a system utilizing a radiometer to detect the millimeter-wave radiation in a predetermined frequency band of atmospheric oxygen associated with an effective range that corresponds to that frequency band. The detected signal is a measure of the temperature of the atmosphere in a predetermined direction and associated with the effective range from the radiometer. For a millimeter-wave radiometer with a frequency passband centered at 50 GHz, the effective range is 40 to 50 km at an altitude of 35,000 ft.

Another object of the invention is to provide a system for generating a temperature map using a passive directional detector which can determine, at predetermined time intervals, atmospheric temperatures in an azimuth plane associated with a predefined range from the detector. The temperature map can then be used to calculate temperature gradients that in turn can be used to compute the vertical wind shear as one of the inputs in the prediction of the presence of clear air turbulence.

A further object of the invention is to provide an aircraft clear air turbulence warning system that uses a passive detector on board the aircraft to generate signals representing horizontal temperature gradients and vertical temperature profiles that can be used to compute the average Richardson number over an atmospheric layer and other atmospheric parameters which in turn can be used to generate a warning when the turbulence exceeds a predetermined value.

DETAILED DESCRIPTION OF THE INVENTION

Figure 1:
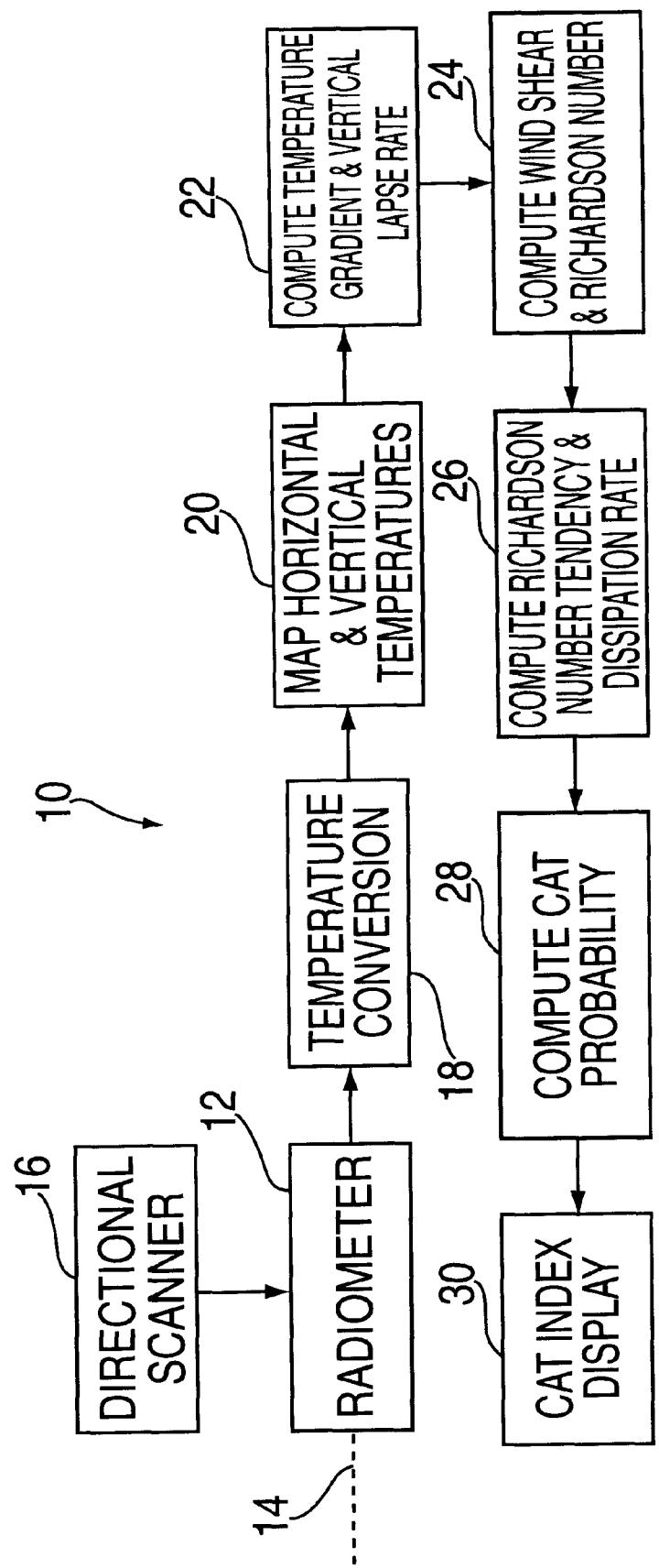
FIG. 1 is a functional block diagram of the preferred embodiment of the invention.

FIG. 1 provides an overview, in the form of a functional block diagram, of the operation of the preferred embodiment of the invention which in this case is an apparatus 10 for installation in an aircraft to detect clear air turbulence. Although the preferred embodiment of the invention is described in terms of its application to aircraft, the invention can have other applications some of which are described below. Installed in a forward, and partially sideways, looking location of the aircraft, such as the nose or a leading portion of a wing is a passive detector 12, preferably a radiometer, for receiving infrared or millimeter-wave radiation from the atmosphere as indicated by a dashed line 14. Also, as indicated by a block 16, the radiometer 12 is connected to a directional scanning mechanism which permits the radiometer 12 to receive the radiation 14 from different directions in both the azimuth and vertical directions or in only the azimuth direction.

Shown at block 18, the apparatus 10 will convert the sterance or energy L at a particular wave length $\lambda$ of the radiation 14 as detected by the radiometer 12 into a value $T_{\mathit{eff}}$ which represents the temperature of the atmosphere at an effective range $R_{\mathit{eff}}$ from the aircraft. The concept of converting the radiation 14 into temperature $T_{\mathit{eff}}$ and the effective range $R_{\mathit{eff}}$ will be described below.

Figure 2:
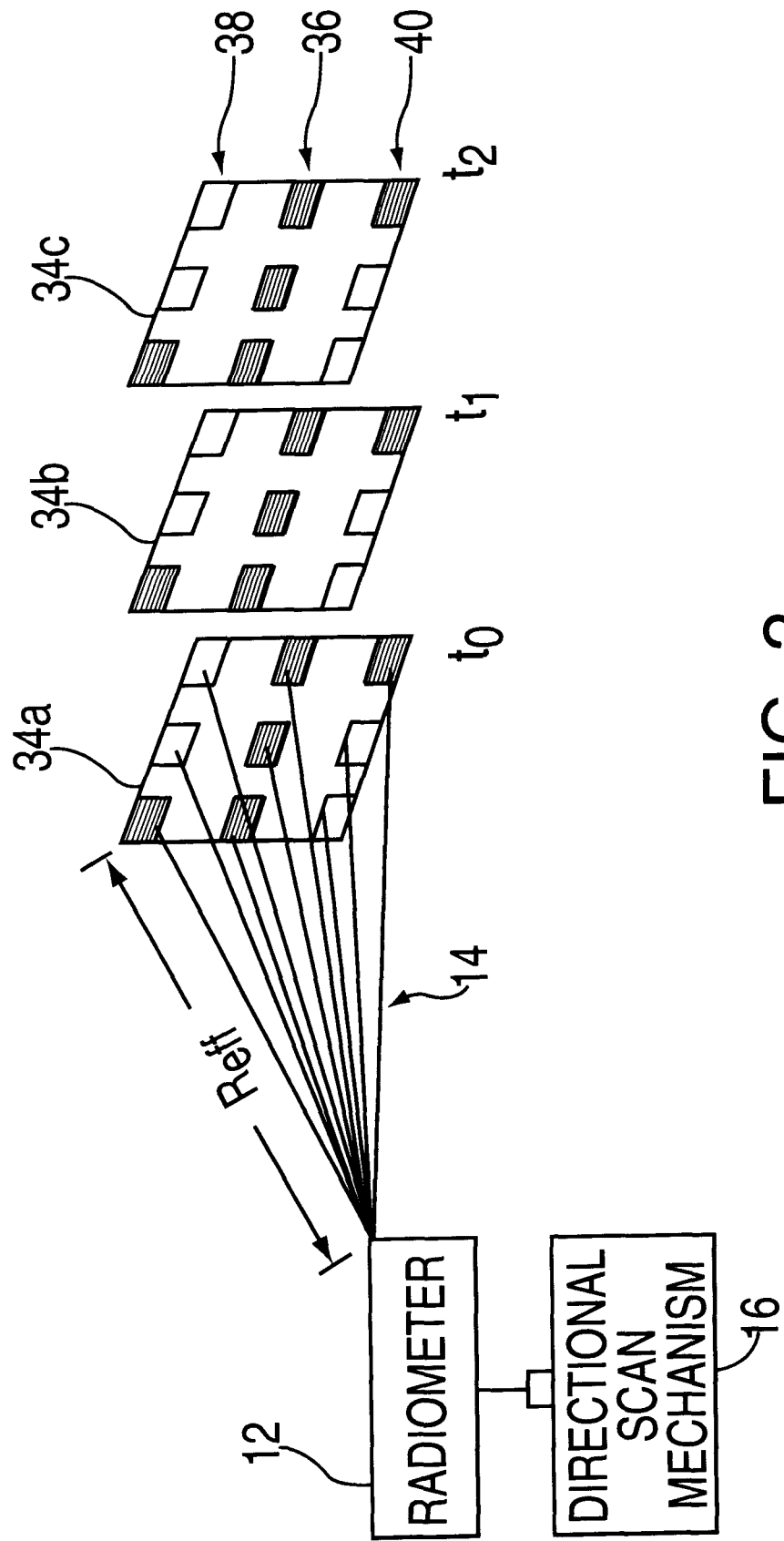
FIG. 2 is pictorial representation of a scanning array illustrating the operation of a radiometer in the invention of FIG. 1 at three time intervals.

Then, as indicated at a block 20, the $T_{\mathit{eff}}$ values obtained will be used to create a horizontal and/or vertical temperature map of atmospheric temperature ahead of the aircraft as illustrated in FIGS. 2–7. As the aircraft progresses along its line of flight, the system data is collected as shown in FIG. 2. The apparatus then generates a temperature map as indicated at 20.

The temperature mapping 20 is used to compute horizontal temperature gradients $\nabla T$, indicated at a block 22, between the temperatures T, contained in the map 20 in a horizontal plane.

As represented by a block 24 and discussed below, the horizontal temperature gradients $\nabla T$ can be used to compute vertical wind shear for the flight level as well as levels above and below the aircraft. The vertical wind shear may then be used to compute the average Richardson number over an atmospheric layer, $Ri_L$, also at various levels.

Effective use of the vertical wind shear information generated at 24 can be used to compute $Ri_L$ tendency and other atmospheric conditions at block 26. The value of $Ri_L$ tendency is used to calculate the probability of clear air turbulence, as indicated by block 28, that in turn can be used as an input to a clear air turbulence display or warning system as shown by block 30.

The following is a more detailed description of the various elements and concepts of the invention as shown in the block diagram of FIG. 1.

For example, FIG. 2 provides an illustration of the operation of the radiometer 12 in conjunction with the directional scan mechanism 16. In this case the scan mechanism 16 directs the radiometer 12 so as to receive radiation 14 from what in effect are 3×3 arrays 34a, 34b and 34c of points in the atmosphere ahead of the aircraft collecting sterance associated with an effective range $R_{\mathit{eff}}$ at time intervals $t_0$, $t_1$ and $t_2$. In the preferred embodiment of the invention, a middle row 36 of the arrays 34a–c is located at the aircraft's flight level while an upper row 38 is located at a level intermediate between the flight level and an upper flight level and a lower row 40 is located at a level intermediate between the flight level and a lower flight level. The radiometer 12 can be any suitable commercially available radiometer that can measure atmospheric temperatures or temperature gradients. An infrared radiometer for detecting $CO_2$ emission in the 12 to 14 $\mu$m spectral region may be employed to determine atmospheric temperature or temperature gradients. For detecting $CO_2$ emission in the 4.0 to 4.3 $\mu$m band, a radiometer of the type described in the above referenced patents such as U.S. Pat. No. 4,937,447 to Barrett, which is hereby incorporated by reference, may be used. A millimeter-wave or microwave radiometer may be used to measure atmospheric temperatures or temperature gradients by detecting the emission from atmospheric oxygen in the frequency band between 49 and 70 GHz and in the vicinity of 118 GHz. Because of its longer wavelengths, the millimeter-wave spectral region has an advantage of having fairly good transmission in the presence of clouds, fog, dust, etc. In another preferred embodiment, only one horizontal temperature map at one level is used for determining the temperature gradient.

Figure 3:
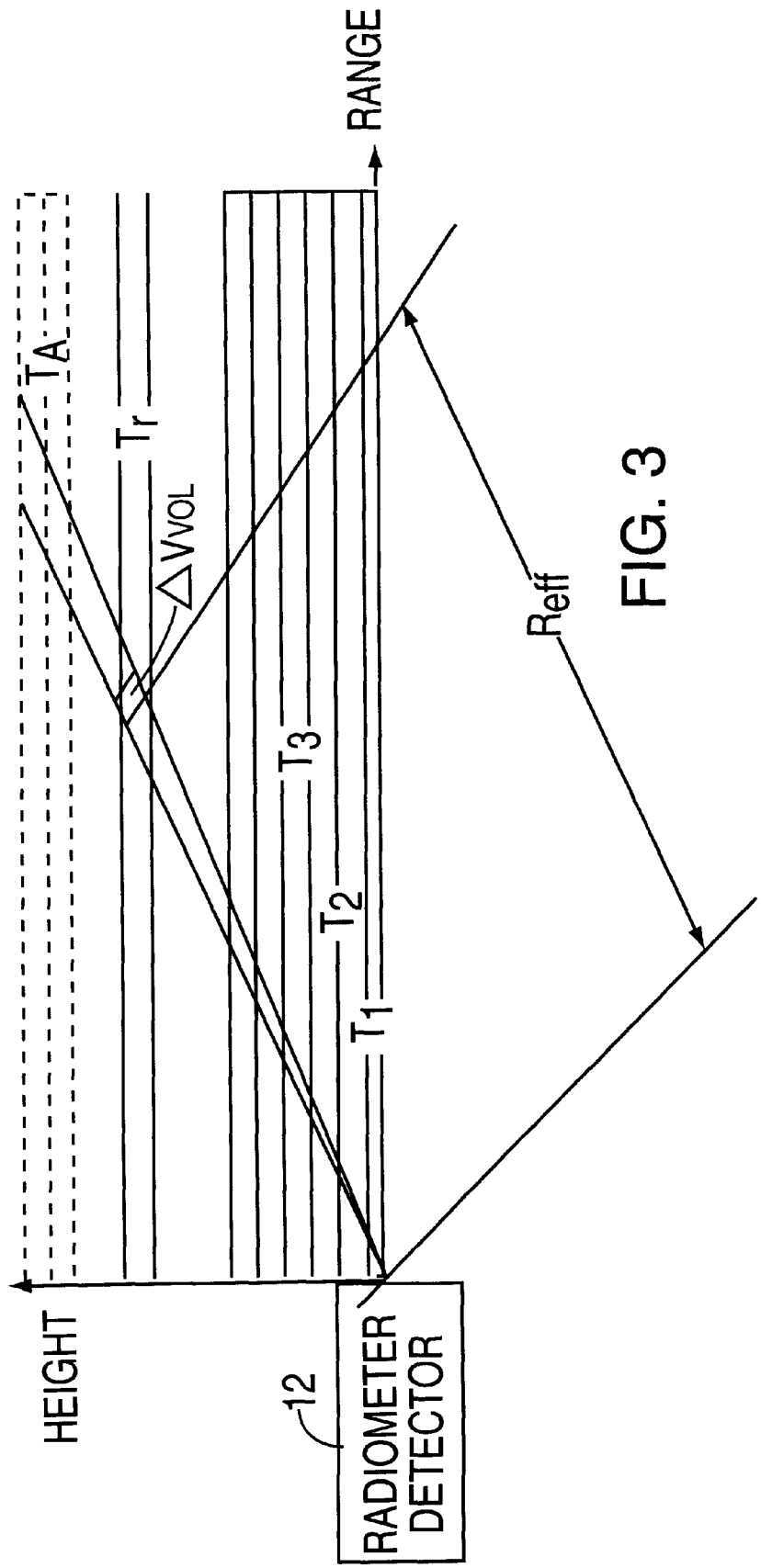
FIG. 3 is a pictorial representation of a section of the atmosphere illustrating the operation of the radiometer of FIG. 1.

Referring also to FIG. 1 and FIG. 3, the temperature conversion 18 of each point in the arrays 34a–c is accomplished by translating the radiance $L(\lambda)$ received by the radiometer 12, where the wavelength is $\lambda$, into a signal that is associated with a temperature $T_{\mathit{eff}}$ of the volume of air seen by the radiometer. The temperature, $T_{\mathit{eff}}$, is associated with the effective range, $R_{\mathit{eff}}$ that is the weighted average distance of the signal reaching the radiometer 12. This use of $R_{\mathit{eff}}$ is only useful in conditions for which $R_{\mathit{eff}}$ does not vary significantly during aircraft flight across reasonable distances at a fixed altitude. It has been found that $R_{\mathit{eff}}$ does not vary significantly for normal flight conditions, i.e., $R_{\mathit{eff}}$ is determined by only the wavelength $\lambda$, the altitude and latitude of the aircraft, the elevation angle of the radiometer's line of sight and the particular time of year. This has been verified through the use of the FASCODE program. The FASCODE program is a computer model of atmospheric transmission and radiance in the infrared and millimeter-wave spectral regions. This program is described and identified in the aforementioned Barrett, U.S. Pat. No. 4,937,447. The following Table 1 is a table illustrating the FASCODE (using the mid-latitude, winter atmosphere model) computed effective range $R_{\mathit{eff}}$ vs. $\lambda$ in the case that $\lambda$ falls within the preferred band of wavelengths of $CO_2$ emission for a zenith angle of 90 degrees and an altitude of 35,000 ft.

TABLE 1

| Wavelength ($\mu$m) | Effective Range (km) |
|---|---|
| 12.2 | 121 |
| 12.3 | 106 |
| 12.4 | 98.2 |
| 12.5 | 84.4 |
| 12.6 | 76.6 |
| 12.7 | 918 |

TABLE 1-continued

| Wavelength (μm) | Effective Range (km) |
|---|---|
| 12.8 | 105 |
| 12.9 | 106 |
| 13.0 | 89.3 |

Figure 8:
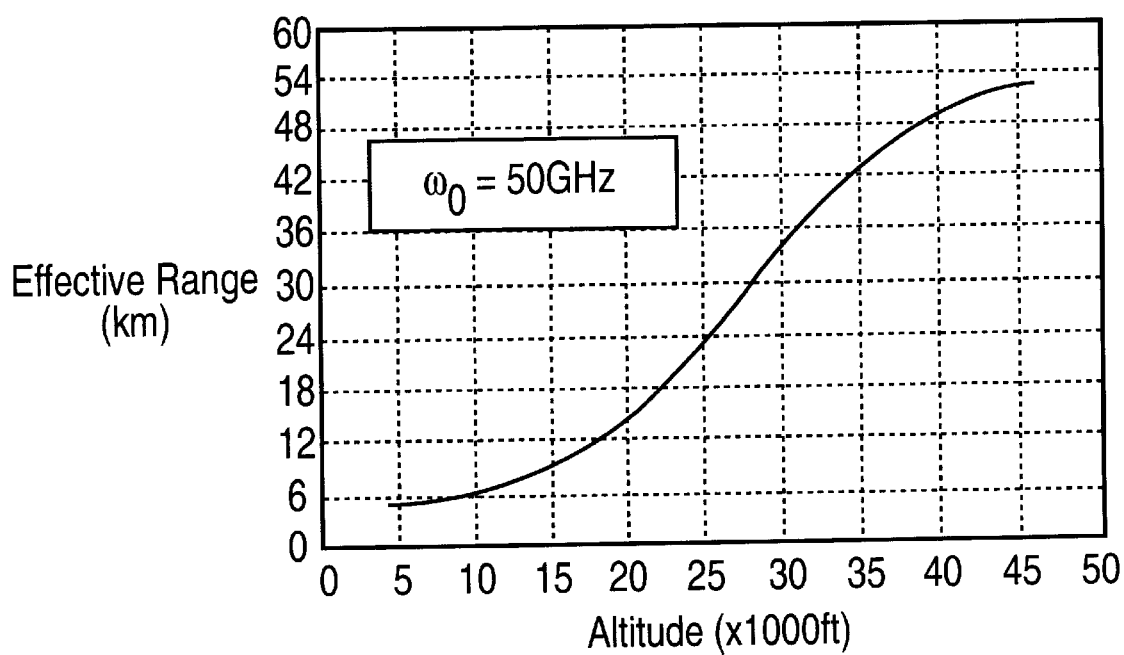
FIG. 8 is a plot of the FASCODE modeling results showing the altitude variation of the effective range for a millimeter-wave radiometer operating at 50 GHz.

The FASCODE program has also been used to calculate effective range values for the millimeter-wave (mmW) region based on the detection of radiation from atmospheric oxygen at a wavelength of about 6.0 mm (50 GHz). Calculations were carried out using the mid-latitude summer atmosphere model with the zenith angle of the mmW radiometer line-of-sight set at 89 degrees. A plot of the altitude variation of the effective range for the mmW radiometer is shown in FIG. 8. These calculations are based on a radiometer center frequency of 50 GHz with a full width at half maximum (FWHM) transmission of about 1 GHz. The effective range varies from less than 6 km for altitudes less than 10,000 ft to greater than 42 km for altitudes greater than 35,000 ft.

It has been found that the wavelength 12.2 μm of $CO_2$ is particularly effective at measuring $T_{eff}$ associated with a range $R_{eff}$ of approximately 120 km for one altitude and latitude. It should be noted that one of the advantages of the invention is that it makes use of previously computed values of $R_{eff}$ so that it is possible to provide accurate maps of atmospheric temperature. Also it is possible to store tables of $R_{eff}$ vs. Altitude and λ vs. $R_{eff}$ such as shown in the Table 1 above in order to adjust the sensitivity of the system and the effective range for various conditions. Alternatively, it is possible to use more than one wavelength λ to measure more than one $T_{eff}$ at corresponding ranges $R_{eff}$ from the aircraft.

The operation of our apparatus may be illustrated by means of a numerical example. At 12.2 μm, the effective range is 121 km (Table 1) and the field of view of the IR radiometer is 0.10 degrees. At a distance corresponding to the effective range (121 km) in front of the aircraft, the field of view of the radiometer subtends a distance of 607 ft, which is the thickness of the atmospheric layer over which the atmospheric temperature is averaged. Therefore, the layered Richardson number, $Ri_L$, as determined by Eq. 4, corresponds to an average value measured over an atmospheric layer 607 ft thick. For an aircraft at 35,000 ft cruising at 500 knots, the time required to traverse the distance corresponding to an effective range of 121 km is 7.8 minutes. This should provide sufficient warning time for the pilot to prepare the aircraft for the turbulence encounter and/or take evasive action.

The radiance L(λ) detected by the radiometer 12 is a function of the temperature of the naturally occurring $CO_2$ in the atmosphere. It is possible to associate the temperature of the air in $\Delta V_{vol}$ shown in FIG. 3 with a given signal. The total signal, L(λ), is the sum of the contributions, $L(\lambda)_i$ of signal from each volume element i along the line of sight of the radiometer 12. Thus $$L(\lambda) = \sum_i L(\lambda)_i = \sum_i S_i \tau_i \quad (9)$$

where $S_i$ is the radiance from a volume element i intercepted by the detector's line of sight and $\tau_i$ is the transmission of the radiance between the volume element i and the detector. The temperature $T_{eff}$ is associated with L(λ), where $T_{eff}$ is the temperature of a blackbody source times a calibration factor which produces the same radiometer signal as L(λ). This calibration factor takes into account, that under certain conditions of high altitudes and/or elevation angles, the atmosphere behaves as a graybody emission source and not as a blackbody emission source. A transparency correction of the atmosphere is used to account for the graybody behavior (see B. L. Gary, "Observational Results Using the Microwave Temperature Profiler During the Airborne Antarctic Ozone Experiment," *Journal of Geophysical Research*, (1989), 94, 11223). The effective distance $R_{eff}$ is defined according to the equation $$R_{eff} = \frac{\sum_i R_i L(\lambda)_i}{\sum_i L(\lambda)_i} \quad (10)$$

As indicated at 18 of FIG. 1, the temperature $T_{eff}$ is associated with $R_{eff}$ and a map is generated at 20 with the temperature $T_{eff}$ at a distance $R_{eff}$ in the appropriate direction from the aircraft. For normal flight conditions, $R_{eff}$ does not vary significantly and is determined only by altitude, elevation angle and latitude for a given time of year. With respect to FIG. 3, the altitude of $\Delta V_{vol}$ for a $R_{eff}$ of 120 km will be about 1000 ft. above the flight level of the aircraft due to the earth's curvature assuming the radiometer 12 is directed toward the horizon.

Figure 4:
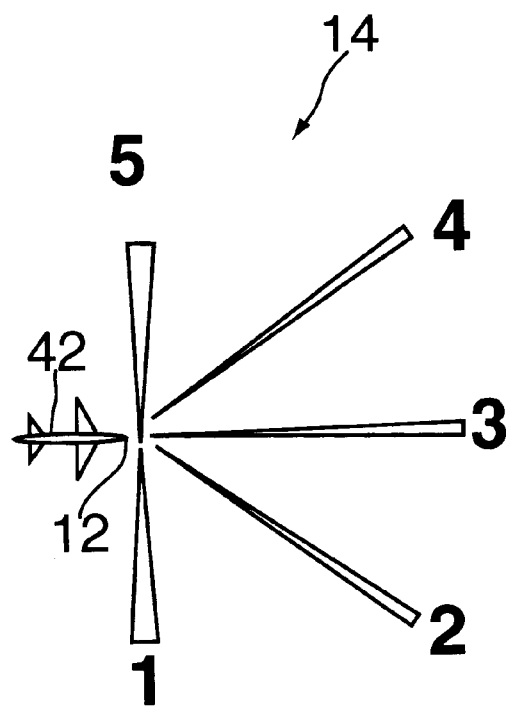
FIG. 4 is a pictorial representation of an aircraft operating the radiometer of FIG. 1 in a horizontal scan mode.
Figure 6:
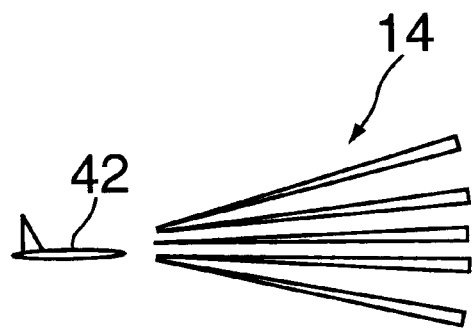
FIG. 6 is a pictorial representation of an aircraft operating the radiometer of FIG. 1 in a vertical scan mode.
Figure 5:
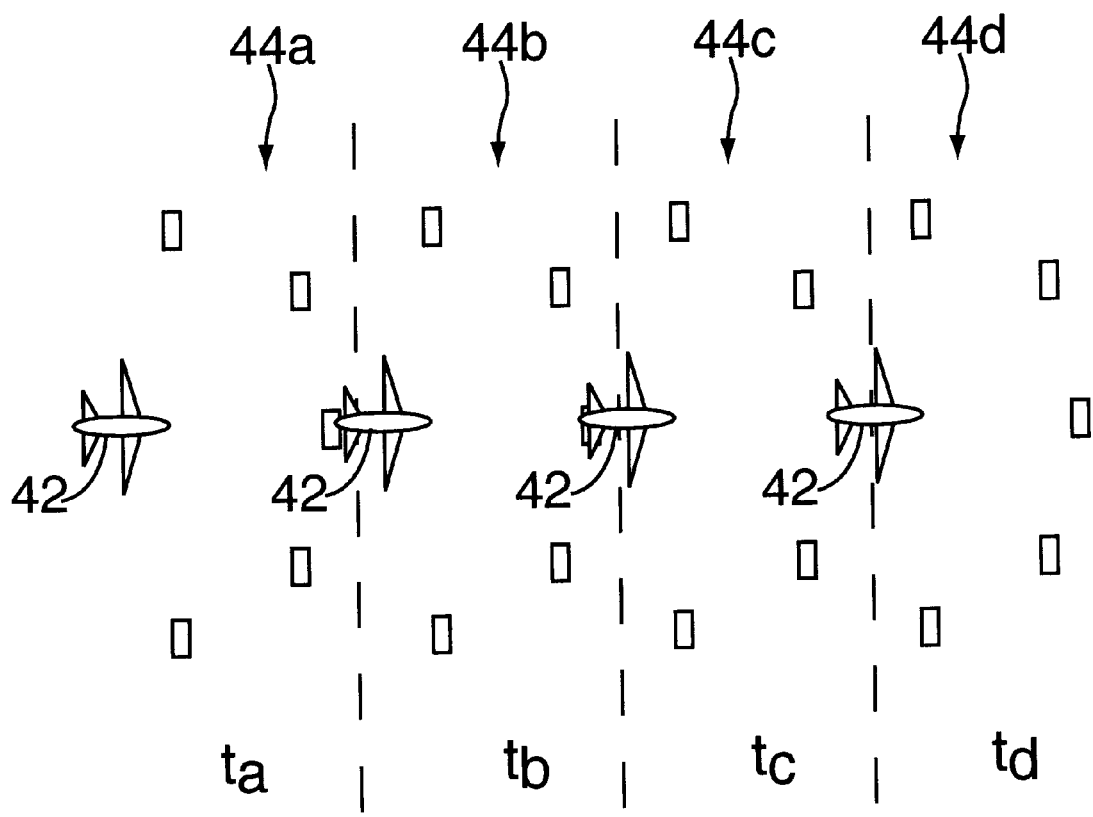
FIG. 5 is a pictorial representation of an aircraft acquiring a horizontal temperature map according to the invention of FIG. 1.

FIGS. 4-6, illustrate how the temperature mapping 20 can be accomplished. In FIG. 4, an aircraft 42 having the radiometer 12 mounted in its nose causes the radiometer 12 to perform an azimuth scan of 180°. At each of the five positions shown in FIG. 4, the radiometer 12 will detect the radiance 14. In this manner a horizontal temperature map is generated. The radiometer can detect signals sufficiently fast that the motion of the aircraft can be ignored. FIG. 5 shows a series of locations indicated by a set of rectangular boxes $44_{a-d}$ that correspond to a set of time intervals $t_{a-d}$ as the aircraft 42 proceeds along its flight path, where the temperatures $T_{eff}$ detected for each location $44_{a-d}$ can be stored in memory. Similarly, as illustrated in FIG. 6, the radiometer 12 in the aircraft 42 can perform a vertical scan so that temperatures of locations above and below the flight path can be mapped. As a result, it is possible to generate temperature maps for horizontal planes above and below the aircraft 42.

By mapping the temperature fields 20 as described above, it is possible to compute horizontal temperature gradients ∇T as indicated at 22 of FIG. 1. It is also possible, by using the vertical temperature mapping to calculate the temperature lapse rate ∂T/∂z for use in calculation of the Richardson Number for computing the probability of clear air turbulence.

Figure 7:
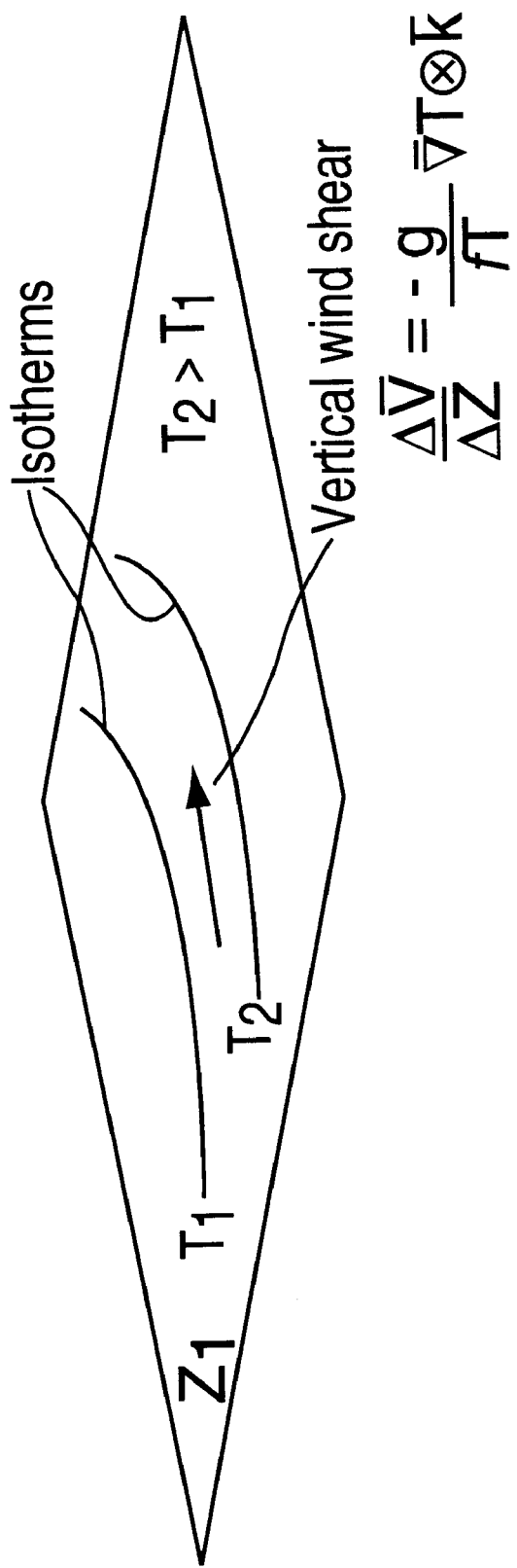
FIG. 7 is pictorial representation of the atmospheric thermal gradient and its relationship to the vertical wind shear according to the invention.

As illustrated by FIG. 7, one of the salient features of the invention is the capability of utilizing the temperature gradients computed at 22 to generate values representing vertical wind shear at a horizontal plane $Z_1$. In this case, only a horizontal mapping at one level is needed. For example, a method according to the invention whereby the thermal wind concepts can be used to compute vertical wind shear, ΔV/Δz, as indicated at 24 of FIG. 1, makes use of the following relation:

$$\frac{\Delta V}{\Delta z} = -\left[\frac{g}{fT}\right] \nabla T \otimes k \quad (11)$$

where g is the acceleration due to gravity, f is the Coriolis parameter resulting from the earth's rotation, T is the temperature at altitude $Z_1$, $\nabla T$ is the vector representing the temperature gradient at level $Z_1$, k is the unit vector parallel to the aircraft's local vertical and the symbol ⊗ represents the vector cross-product operator. Equation 11 may be found in any standard meteorological text such as Dynamical and Physical Meteorology by G. J. Haltiner and F. L. Martin, (McGraw-Hill, N.Y., 1957) p. 204.

This invention relates to the use of the temperature mapping function 20 along with the computation of vertical temperature gradients 22 to compute the probability of clear air turbulence 28. In particular, the vertical temperature mapping 20 can be used to calculate the lapse rate $\Delta T/\Delta z$ for determination of the average layered Richardson number $Ri_L$ which is correlated with turbulent conditions. $Ri_L$ is a measure of the probability of CAT. For $Ri_L$ below 0.5, atmospheric turbulence occurs and CAT is likely. Severity of CAT increases with decreasing $Ri_L$. Referring again to FIG. 1, the probability of clear air turbulence is determined at 28 with the result displayed on the CAT display 30.

The embodiment of the invention in FIG. 1 has been described in terms of its use in connection with an aircraft traversing temperature fields in its flight path. However, this type of apparatus can also adapted for use in mapping temperature fields from a fixed geographical position. By using the radiometer 12 at a fixed site to scan temperature at the effective range $R_{eff}$ as described above over a period of time as the weather moves over the radiometer, it is possible to generate a map of the temperature fields for a wide area. The temperature map can then be used for warnings of wind conditions such as clear air turbulence and dry microburst conditions. Another use at a fixed position is to scan the temperature field in 360° azimuth and in elevation to determine wind differences, or CAT at one time.

Figure 9:
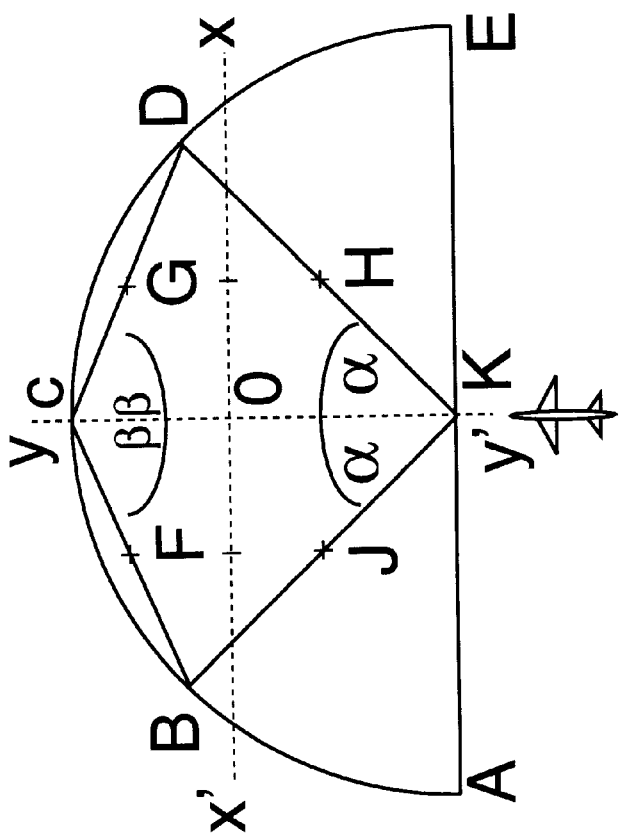
FIG. 9 is an illustration of the observational geometry of the invention.

Shown in FIG. 9 is the observational geometry of the invention. ABCDE is a semicircle centered at K, with ABCDE lying in the same horizontal plane. ABCDE represents one of several horizontal planes with separation ranging from 100 m to 300 meters. The temperatures at A,B,C,D and E are determined radiometrically as described above. F,G,H,J are located at the midpoints of BC, CD, DK, KB respectively. Together they form the rectangle FGHJ. The line xox' bisects the sides FJ and GH, and the line yoy' bisects the sides FG and HJ, and together xox' and yoy' form a rectangular coordinate system.

Figure 10:
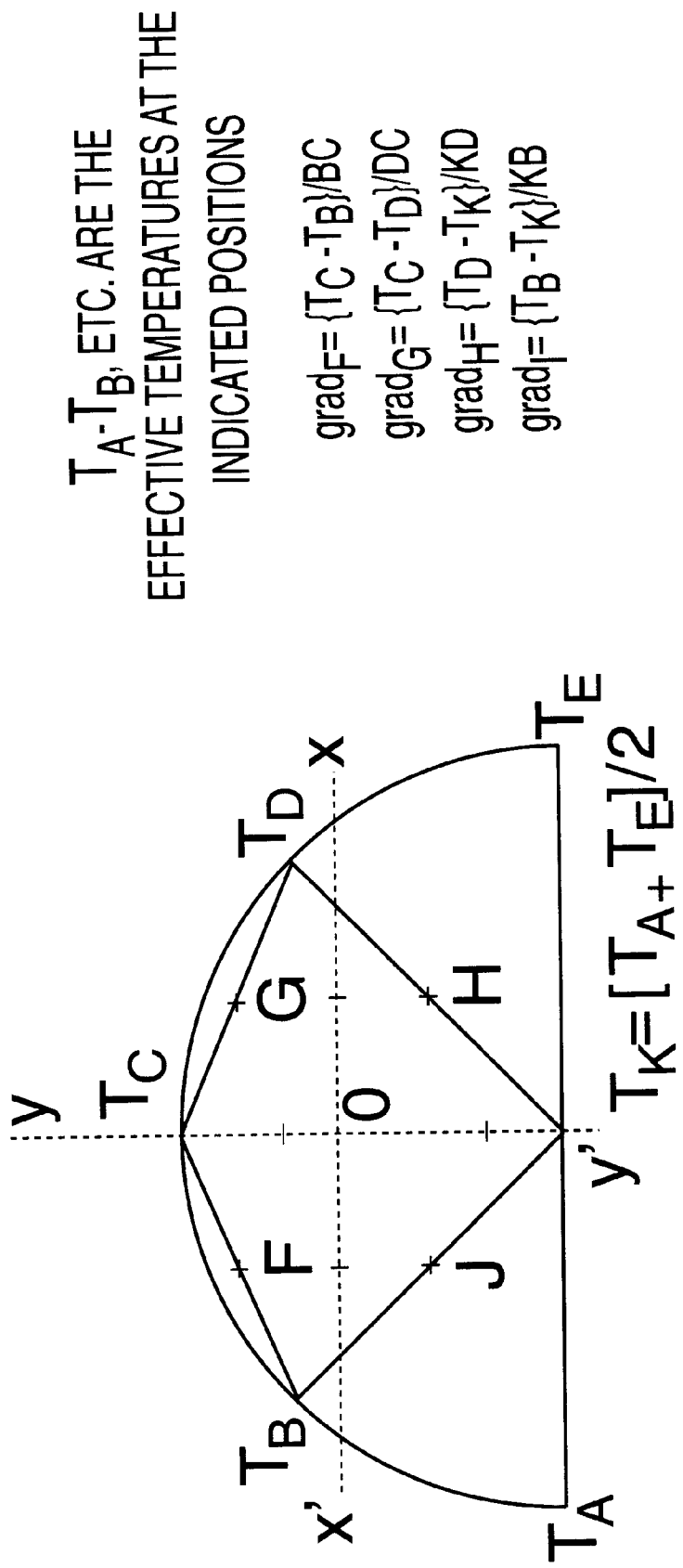
FIG. 10 is a geometric illustration of a method for calculating the temperature gradient from FIG. 9.
Figure 11:
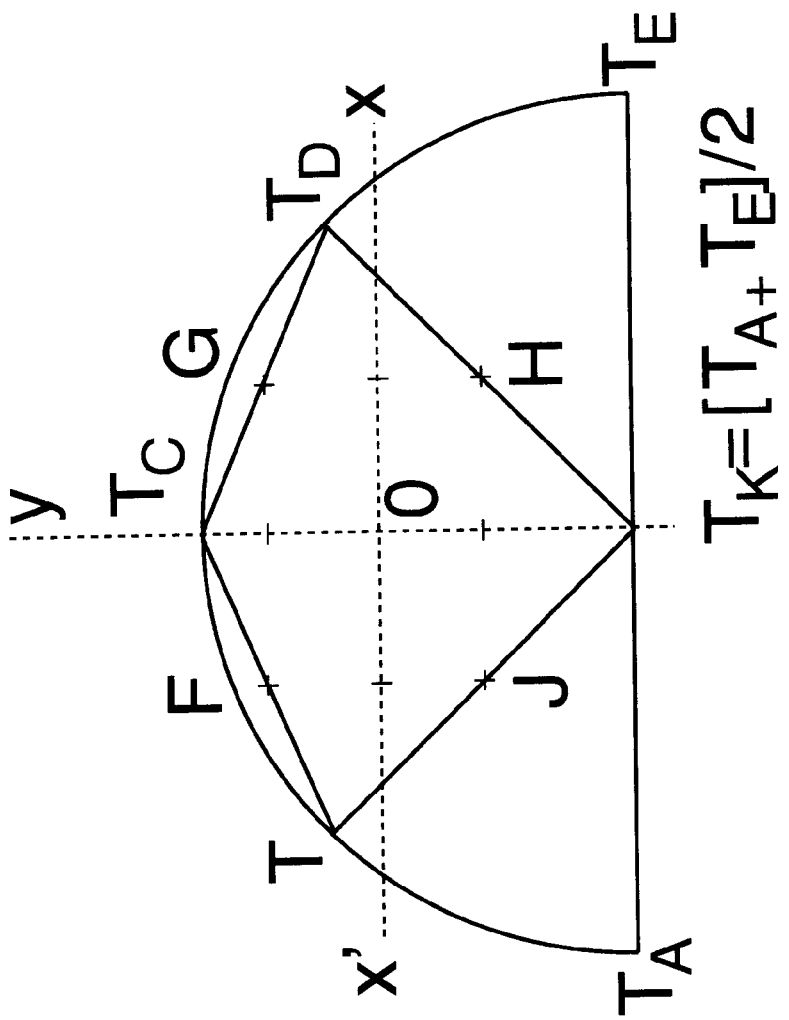
FIG. 11 is geometric illustration of a method for calculating vertical shear of the horizontal wind from the temperature field.

FIG. 10 illustrates how the temperature gradients may be determined and FIG. 11 illustrates how the vertical wind shear of the horizontal wind is determined from the temperature field.

From the described geometry, the key input parameters necessary to predict the probability of detection and the false alarm ratio of CAT can now be computed in accordance with the previously-cited equations. Further, it is also possible to compute the thermal vorticity:

$$\frac{\partial}{\partial p}\xi = \frac{R}{fp}\nabla^2 T$$

As would be evident to one skilled in the art, it is possible to generate a map of $Ri_L$ and $\epsilon$ conditions at various altitudes and azimuths and ranges relative to a moving platform or a fixed location. When the moving platform is an aircraft, the map of atmospheric conditions gives the pilot an understanding of atmospheric conditions that surround the aircraft and what atmospheric conditions exist ahead, above and below the aircraft. This feature may be used to provide warning to the pilot and passengers of probable CAT and allow the aircraft to prepare for CAT or, alternatively, allow the pilot to modify the course of the aircraft to avoid the CAT. Additional meteorological parameters or combinations of meteorological parameters can be used to predict and avoid CAT.

Having described preferred embodiments of apparatus and methods for predicting clear air turbulence (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claim is:

1. An apparatus for determining atmospheric conditions based on the calculation of the layered average Richardson number, $Ri_L$, comprising:

a) first temperature measurement means for measuring a plurality of temperatures at an altitude $Z_1$;

b) means, responsive to the first temperature measurement means, for calculating $\nabla T$, the vector temperature gradient, over the altitude $Z_1$;

c) wind shear computational means, responsive to the means for calculating the vector temperature gradient, for determining $\Delta V/\Delta z$, the vertical wind shear, where V is the horizontal wind vector;

d) second temperature measurement means for determining $\Delta\theta/\Delta z$, the vertical lapse rate of the potential temperature, where $\theta$ is the potential temperature and z is the vertical direction:

e) calculation means, responsive to the wind shear computational means and the second temperature measurement means, for calculating $Ri_L$ using the equation:

$$Ri_L = \left(\frac{g}{\theta}\right)\frac{\left(\frac{\Delta\theta}{\Delta z}\right)}{\left|\frac{\Delta V}{\Delta z}\right|^2}$$

where g is acceleration due to gravity; and f) calculation means responsive to the wind shear computational means for calculating $\epsilon$, the strength of the turbulence, using the equation:

$$\varepsilon = \left(K_H\left(\frac{\Delta V}{\Delta z}\right)\right)^2\left(\frac{K_M}{K_H} - Ri_L\right).$$

2. The apparatus of claim 1 further comprising means for predicting clear air turbulence, comprising:

means for comparing $Ri_L$ against a threshold value;

means for determining whether $\epsilon$ is increasing or decreasing; and means for indicating the probability for clear air turbulence when $Ri_L$ is equal to or less than the threshold value and $\epsilon$ is increasing.

3. The apparatus of claim 2 wherein the threshold value is 0.5.

4. An apparatus for determining atmospheric conditions based on the calculation of the layered average Richardson number, $Ri_L$, comprising:

a) first temperature measurement means for measuring a plurality of temperatures at an altitude $Z_1$, where the first temperature measurement means comprises a passive millimeter wave detector or a passive micrometer wave detector;

b) means, responsive to the first temperature measurement means, for calculating $\nabla T$, the vector temperature gradient, over the altitude $Z_1$;

c) wind shear computational means, responsive to the means for calculating the vector temperature gradient, for determining $\Delta V/\Delta z$, the vertical wind shear, where V is the horizontal wind vector;

d) second temperature measurement means for determining $\Delta\theta/\Delta z$, the vertical lapse rate of the potential temperature, where $\theta$ is the potential temperature and z is the vertical direction; and e) calculation means, responsive to the wind shear computational means and the second temperature measurement means, for calculating $Ri_L$ using the equation:

$$Ri_L = \left(\frac{g}{\theta}\right)\frac{\left(\frac{\Delta\theta}{\Delta z}\right)}{\left|\frac{\Delta V}{\Delta z}\right|^2}$$

where g is acceleration due to gravity.

5. The apparatus of claim 4 where the passive millimeter wave detector or a passive micrometer wave detector comprises means for detecting radiation $L(\lambda)$ having a wavelength $\lambda$ from a predetermined direction and the first temperature measurement means further comprises computational means, responsive to the detector, for computing a value $T_{\mathit{eff}}$ representing the temperature of the atmosphere at an effective range $R_{\mathit{eff}}$ from the detector.

6. A method for determining atmospheric conditions based on the calculation of the layered average Richardson number, $Ri_L$, comprising the steps of:

a) measuring a plurality of temperatures at an altitude $Z_1$;

b) in response to the measurement of a plurality of temperatures, calculating $\nabla T$, the vector temperature gradient, over the altitude $Z_1$;

c) in response to the vector temperature gradient, determining $\Delta V/\Delta z$, the vertical wind shear, where V is the horizontal wind vector;

d) determining $\Delta\theta/\Delta z$, the vertical lapse rate of the potential temperature, where $\theta$ is the potential temperature and z is the vertical direction;

e) in response to the determination of vertical wind shear and vertical lapse rate of the potential temperature, calculating $Ri_L$ using the equation:

$$Ri_L = \left(\frac{g}{\theta}\right)\frac{\left(\frac{\Delta\theta}{\Delta z}\right)}{\left|\frac{\Delta V}{\Delta z}\right|^2}$$

where g is acceleration due to gravity; and f) in response to the determination of wind shear, calculating $\epsilon$, the strength of the turbulence, using the equation:

$$\varepsilon = \left(K_H\left(\frac{\Delta V}{\Delta z}\right)\right)^2\left(\frac{K_M}{K_H} - Ri_L\right)$$

7. The method of claim 6 further comprising the step of predicting clear air turbulence, comprising the steps of:

comparing $Ri_L$ against a threshold value;

determining whether $\epsilon$ is increasing or decreasing; and indicating the probability for clear air turbulence when $Ri_L$ is equal to or less than the threshold value and $\epsilon$ is increasing.

8. The method of claim 7 where step of comparing $Ri_L$ against a threshold value comprises the step of comparing $Ri_L$ against a threshold value of 0.5.

9. A method for determining atmospheric conditions based on the calculation of the layered average Richardson number, $Ri_L$, comprising the steps of:

a) measuring a plurality of temperatures at an altitude $Z_1$, where the step of measuring a plurality of temperatures comprises the steps of detecting radiation $L(\lambda)$ having a wavelength $\lambda$ from a predetermined direction; and computing a value $T_{\mathit{eff}}$ representing the temperature of the atmosphere at an effective range $R_{\mathit{eff}}$;

b) in response to the measurement of a plurality of temperatures, calculating $\nabla T$, the vector temperature gradient, over the altitude $Z_1$;

c) in response to the vector temperature gradient, determining $\Delta V/\Delta z$, the vertical wind shear, where V is the horizontal wind vector;

d) determining $\Delta\theta/\Delta z$, the vertical lapse rate of the potential temperature, where $\theta$ is the potential temperature and z is the vertical direction; and e) in response to the determination of vertical wind shear and vertical lapse rate of the potential temperature, calculating $Ri_L$ using the equation:

$$Ri_L = \left(\frac{g}{\theta}\right)\frac{\left(\frac{\Delta\theta}{\Delta z}\right)}{\left|\frac{\Delta V}{\Delta z}\right|^2}$$

where g is acceleration due to gravity.

* * * * *